Figure 1:
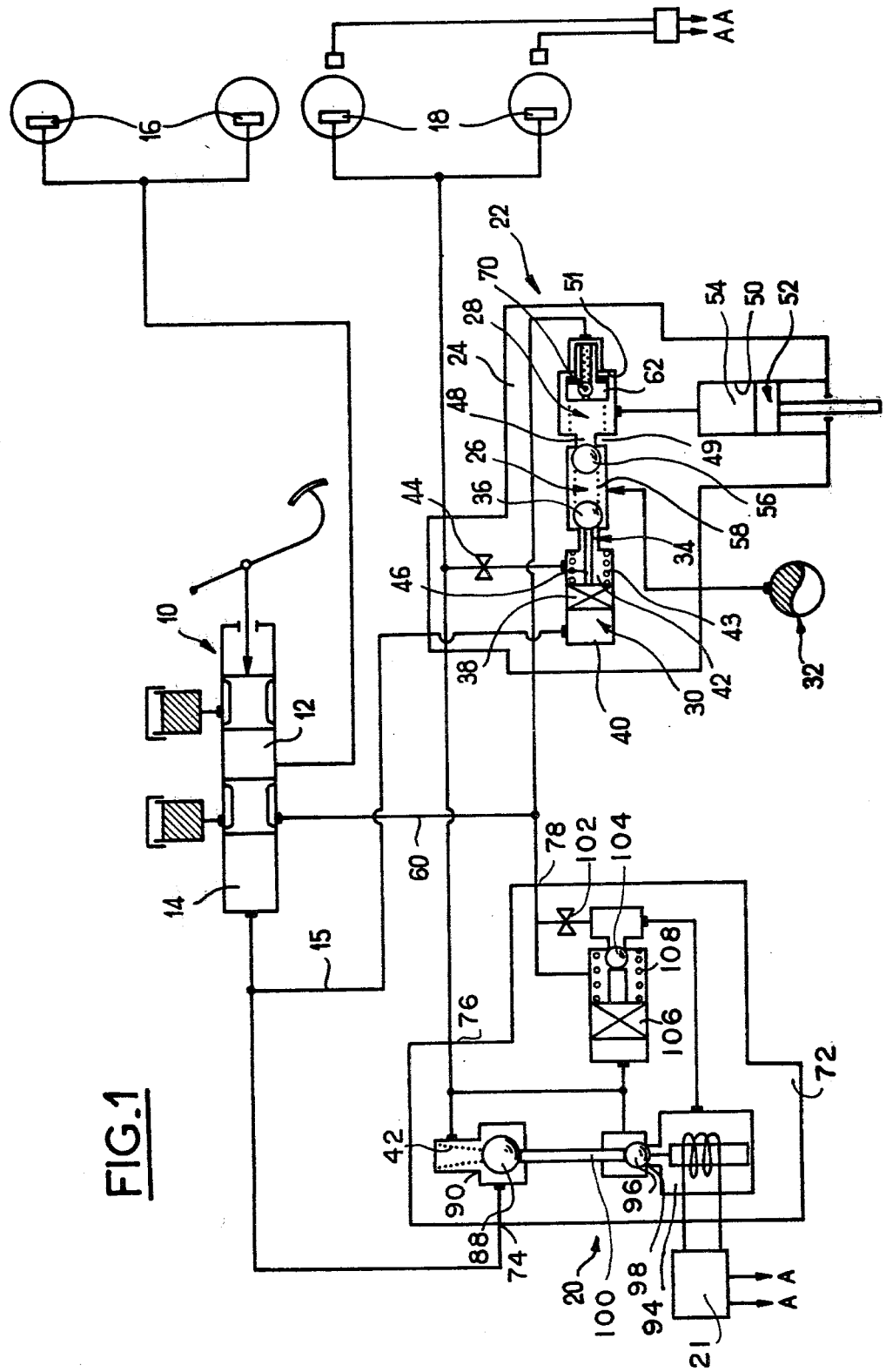

United States Patent [19]

Kervogoret

[11] 4,218,100

[45] Aug. 19, 1980

[54] ANTISKID BRAKE SYSTEM COMPRISING A FLUID REPLENISHING DEVICE, AND A REPLENISHING DEVICE FOR SUCH A SYSTEM

[75] Inventor: Gilbert Kervogoret, Argenteuil, France

[73] Assignee: Societe Anonyme D.B.A., Paris, France

[21] Appl. No.: 941,490

[22] Filed: Sep. 11, 1978

[51] Int. Cl.² ............................................. B60T 8/02
[52] U.S. Cl. ............................. 303/119; 303/22 R; 303/116
[58] Field of Search .................... 303/113–119, 303/60, 22, 110; 188/181, 349, 195

[56] References Cited

U.S. PATENT DOCUMENTS

| 3,532,391 | 10/1970 | Klein | 303/119 |
| 3,639,009 | 2/1972 | Klein et al. | 303/119 |

FOREIGN PATENT DOCUMENTS 2235027 5/1976 France .
1435677 5/1976 United Kingdom .

*Primary Examiner*—Douglas C. Butler
*Attorney, Agent, or Firm*—Paul David Schoenle; Ken C. Decker

[57] ABSTRACT

A hydraulic vehicle braking system including an operator-controlled fluid pressure source connected to the actuator of a vehicle wheel brake. An antiskid valve is interposed between the operator-controlled pressure source and the brake actuator and is responsive to wheel skidding to interrupt the fluid connection until the end of the braking phase and to permit a fluid connection between the brake actuator and a low pressure fluid reservoir in response to subsequent wheel skidding. The system includes a second source of pressurized fluid and a device for replenishing the brake actuator having a pressure responsive valve which opens fluid flow connection between the second fluid pressure source and the brake actuator when the pressure difference between the operator-controlled pressure source and the brake actuator exceeds a predetermined value.

11 Claims, 2 Drawing Figures

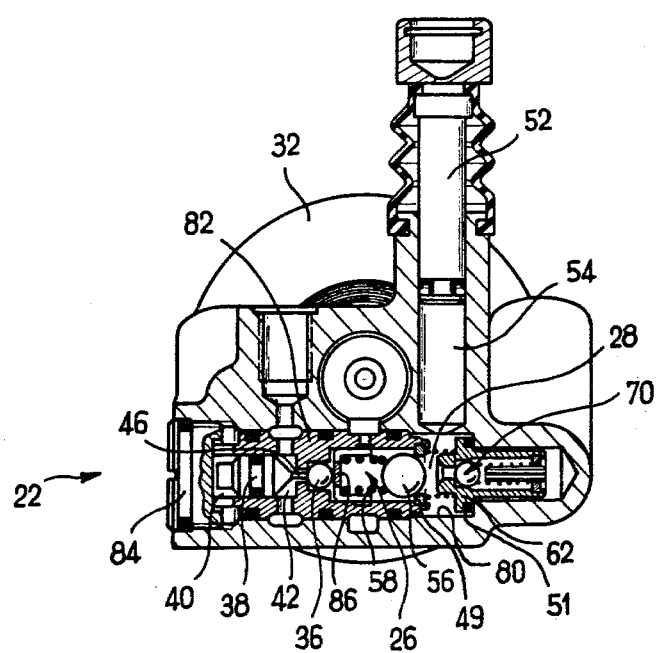
FIG_2

ANTISKID BRAKE SYSTEM COMPRISING A FLUID REPLENISHING DEVICE, AND A REPLENISHING DEVICE FOR SUCH A SYSTEM

The invention relates to an antiskid brake system for a motor vehicle.

A known antiskid brake system comprises at least one actuator for a brake associated with a wheel of the vehicle and a fluid pressure source controlled by an operator and connected to the brake actuator by antiskid valve forming means. The valve forming means comprise an isolating valve which is normally open, by way of which the pressure source is connected to the brake actuator, and which is responsive, during a braking phase, to the detection of a risk of skidding of the wheel so as to interrupt the fluid connection between the pressure source and brake actuator until the end of the braking phase. The valve forming means also comprise a normally closed relief valve which is situated between the brake actuator and a low pressure reservoir and which is opened to permit brake fluid to be discharged from the brake actuator to the reservoir in response to the detection of any subsequent risk of skidding, during a braking phase. During an anti-skid braking cycle, therefore, the pressure drops in stages, each of which corresponds to the detection of a risk of skidding of the wheel.

A brake system like that mentioned above is described, for example, in French patent published under No. 2 235 027, in the name of the Applicant.

The valve forming means in French Patent No. 2 235 027 are relatively simple in design and permit satisfactory operation of the anti-skid brake system. Attempts have been made, however, to improve still further the braking efficiency obtainable by a brake system using valve forming means of this type. In particular, it is desirable to preserve high braking efficiency when passing from ground with poor adhesion to ground with high adhesion, and the invention relates more particularly to a device intended for this purpose.

The invention proposes an antiskid brake system comprising at least one actuator for a brake associated with a wheel of a vehicle, a fluid pressure source controlled by an operator and connected to the brake actuator by antiskid valve forming means, the valve forming means being normally open to connect the said pressure source to the brake actuator and being responsive, during a braking phase, to the detection of a risk of skidding of the wheel so as to interrupt the fluid connection between the pressure source and brake actuator until the end of the braking phase, and so as to permit subsequently during the braking phase a fluid connection between the brake actuator and a low pressure source in response to the detection of any risk of skidding, the antiskid brake device being characterised in that it comprises a means for replenishing the brake which comprises a pressure fluid reserve source and a connection to connect the reserve source to the brake actuator, means for controlling the flow of fluid through the connection, the control means comprising a valve forming element situated in the connection and normally urged onto a seat under the influence of the pressure from the reserve source, operating means responsive to a pressure difference between the pressure supplied by the pressure source and the pressure prevailing downstream of the valve forming element that is, between the valve forming element and the brake actuator, so as to effect opening of this valve when the pressure difference exceeds a predetermined value.

In a preferred embodiment of the invention, the operating means comprise a housing containing a bore in which a first piston is slidable so as to separate the bore into a first chamber connected to the pressure source controlled by an operator and into a second chamber situated in the fluid flow path downstream of the valve forming means, the piston being capable of operating a tappet to lift a closure element of the valve forming means when the pressure difference between the first and second chambers exceeds the predetermined value.

In a particularly advantageous embodiment of the invention, the connection leading towards the brakes and situated downstream of the second chamber contains a restriction, the main advantage of which is to allow control of the rate of replenishment of the brake actuators.

The invention will now be described, and further features will become apparent, in the light of the ensuing description with reference to the accompanying drawings, in which:

FIG. 1 is a digrammatic general view of an antiskid brake system embodying the invention; and FIG. 2 represents a section through a replenishing device embodying the invention.

FIG. 1 illustrates a vehicle brake system comprising a pressure source 10 controlled by an operator. In the embodiment shown in FIG. 1 the pressure source is a master cylinder of the tandem type, with a first pressure chamber 12 connected to the brake actuator 16 for the front wheels of the vehicle and a second pressure chamber 14 connected to the brake actuators for the rear wheels of the vehicle. The pressure chamber 14 is connected to the brake actuators 18 by way of an assembly of modulating valves generally designated 20. The modulating valve assembly 20 has a housing 72 containing an inlet orifice 74 connected to pressure chamber 14, an outlet orifice 76 connected to the actuators 18, and a discharge orifice 78 connected to the low-pressure fluid reservoir of the master cylinder 10. The inlet orifice 74 is connected to the outlet orifice 76 by way of an isolation valve of which the closure member 88 is normally biased off its seat 90 by a spring 92. The member 88 is a ball retained in a stepped recess in the housing 72. The outlet orifice 76 is connected to the discharge orifice 78 by way of a relief solenoid valve 94, of which the closure member 96 is normally biased on to its seat 98 by a spring (not shown). The closure members 88, 96, which are movable relative each other, are separated by a stem 100 slidable in the housing 72. A constriction 102 is situated between the solenoid valve 94 and the discharge orifice 78 and is arranged in parallel with a by-pass valve 104. The by-pass valve 104 is held in its closed position by a piston 106 mounted in the housing 72. The piston 106 is exposed to the pressure which prevails in the brake actuators 18, which counteracts resilient means 108. It will merely be stated at this point that in its idle position the valve assembly 20 normally connects the chamber 14 to the brake actuators 18 and disconnects the brake actuators 18 from a low pressure source comprising a fluid reservoir. During a braking phase, that is, from the instant at which the pedal is depressed, the valve assembly 20 is responsive to any signal representing a skidding condition of at least one of the rear wheels, so as to disconnect the chamber 14 from the brake actuators 18 until the end of the braking phase. Thereafter during the braking phase, the valve assembly 20 then provides a connection between the brake actuators 18 and the low pressure source in response to any detection of a risk of skidding of at least one rear wheel.

The brake system also comprises a replenishing device generally designated 22. The replenishing device 22 comprises a housing 24 defining a cavity divided into three compartments 26, 28 and 30. The compartment 26 is connected to a pressure accumulator 32. The compartment 26 is separated from the compartment 30 by a partition containing an axial connecting passage 34. A valve forming element, in this case a ball 36, is urged on to a seat defined at that end of the passage 34 giving on to the compartment 26. The compartment 30 is defined by a bore slidably receiving a piston 38 which divides the compartment into a first chamber 40 connected to the pressure chamber 14 by a line 15, and a second chamber 42, which adjoins the axial passage 34 and communicates with the brake actuators 18 by way of a line containing a constriction 44. A tappet or rod 46 projects from the piston 38 so as to urge the valve 36 off its seat in response to a given pressure difference between the chambers 40, 42.

The replenishing device 22 also comprises a device made up as follows: a blind bore 50 in the housing 24, which is preferably secured to a suspended part of a vehicle, slidably a piston 52 attached to an unsuspended part of the vehicle and hinged so that any relative motion of the unsuspended and suspended parts of the vehicle causes movement of the piston 52 in the bore 50, that is, a variation in volume of the chamber 54 defined in this bore. The chamber 54 communicates with the chamber 28, which is connected in turn to the compartment 26 by an axial passage 48 provided in the wall 49 separating these two compartments. A ball 56 forming a non-return valve is installed in the compartment 26 so as to bear on a valve seat defined at that end of the passage 48 giving on to the compartment 26. A return spring 58 is provided in the compartment 26, between the balls 36 and 56.

To conclude the description, it should also be noted that the compartment 28 can communicate with the fluid reservoir of the master cylinder 10 by way of a line 60 leading to this compartment. A flat non-return valve 62 provided in the compartment 28 has a head capable of bearing in a fluid-tight manner on a shoulder 51 in the compartment in order to disconnect the compartment from the reservoir. Also, a weak spring bearing on the dividing wall 49 biases the flat valve into the closed position. The flat valve 62 contains an excess pressure valve (generally designated 70) mounted between the compartment 28 and the fluid reservoir of the master cylinder and designed to prevent the pressure in the compartment 28 from exceeding a predetermined value substantially corresponding to the maximum pressure in the accumulator 32. Excess pressure valve 70 includes a ball acting against a seat formed in flat valve 62 and spring biased to a normally closed position and forming a non-return valve so disposed as to allow fluid flow from compartment 28 to line 60.

FIG. 2 represents a section through an embodiment of the replenishing device 22 shown in FIG. 1, and elements identical or equivalent to those in FIG. 1 are designated by the same reference numerals. It need merely be noted that the compartments 26, 28 and 30 are defined in a stepped bore 80 in the housing, which contains a cylindrical principal piston 82 which abuts on a shoulder in the stepped bore and is held by a plug 84.

The principal piston is provided with a blind bore at each end to define the compartments 26, 30 respectively. The blind bore defining the compartment 26 supports near its open end a washer which acts as a dividing wall 49 and also as a valve seat for the ball 56. The ball 36 is urged on to its seat by the return spring 58 by way of a movable member 86. The embodiment shown in FIG. 2 does not have a spring biasing the piston 38 so as to counteract the pressure in the chamber 40.

The device just described with reference to FIGS. 1 and 2 operates as follows:

Let us assume that the master cylinder 10 is in its idle position and the brake actuators are not operating. The devices 20 and 22 are in the positions illustrated in the Figures. When the vehicle moves, some deflection occurs in the suspension, and the piston 52 moves to and fro in the bore 50. When the piston 52 has moved in a direction such that the volume of the chamber 54 increases, a depression is produced in the compartment 28 communicating with the chamber 54, and fluid is then drawn in from the reservoir of the master cylinder 10 by way of the line 60 and lifts the valve 62 in order to enter the compartment 28 and chamber 54. If, however, the piston moves in the opposite direction, it compresses the liquid trapped in the chamber 54 and compartment 28. The pressure in the compartment 28 therefore rises, causing the valve 62 to close and valve 56 to open, counteracting the spring 58 and the pressure from the accumulator 32, in order to recharge the latter.

The excess pressure valve 70 is so calibrated that the accumulator can be recharged only to its nominal maximum pressure. If, during charging, the pressure in the compartment 28 threatens to exceed this maximum, the valve 70 opens and the excess fluid is discharged to the reservoir of the master cylinder. Although in the embodiment described, the excess pressure valve is installed in the closure element of the valve 62, it could, of course, be arranged in any other suitable manner.

If the operator applies the brakes, the fluid pressure in the chambers 12, 14 increases and the brake actuators 16, 18 for the front and rear wheels are operated. At this moment fluid can flow freely between the chamber 14 and brake actuators 18 by way of the modulating valve assembly 20. The pressures in the chambers 40, 42 of the compartment 30 are identical, and the valve 36 is held in the closed position.

In response to the detection of a risk of locking of at least one of the vehicle's rear wheels, a conventional electronic device 21 connected to a device for measuring the speed of the rear wheels operates the solenoid 94 of the modulating valve assembly 20, urging member 88 to its closed position by way of stem 100 and disconnecting the chamber 14 of the master cylinder 10 from the brake actuator 18 until the end of the braking phase, i.e. until the moment at which the operator releases the brake pedal operation of solenoid 94 moves member 96 upwards in the figure from its seat 98. Consequently, pressure in the actuators 18 falls, fluid passing from the outlet orifice 76 toward the discharge orifice 78. Additionally, the valve assembly 20 connects the brake actuators 18 to the reservoir of the master cylinder 10 in response to any detection of a risk of locking of at least one rear wheel of the vehicle. After a first risk of locking is detected, therefore, the pressure in the brake actuators decreases in response to every detection of a risk of skidding. If the risk of skidding disappears, however, the chamber 14 and actuators 18 remain disconnected. Nevertheless, owing to the pressure reduction in the brake actuators 18, a large enough pressure difference is created between the chambers 40, 42 to counteract the spring 43 (FIG. 1) and lift the valve 36 off its seat, connecting the accumulator 32 to the brake actuators 18 by way of the passage in the wall 34, the chamber 42 and the constriction 44. Moreover, as soon as the valve 36 opens, constriction also occurs at the ball 36 and tappet 46, upstream of the chamber 42. At the end of the relief period, that is, when the braking torque corresponding to adhesion to the ground becomes normal again, the connection between the brake actuators 18 and the reservoir is interrupted, and the brake actuators 18 are then recharged from the accumulator 32. The rate of pressure increase during replenishing is controlled by the constriction 44. When the pressure in the chamber 42 has risen enough for the piston 38 to be urged to the left under its influence (and under the influence of the spring 43 in the case of FIG. 1), the valve 36 closes again. This takes place provided that the fluid pressure communicated from the master cylinder 10 to the chamber 40 has not become too high in relation to the pressure prevailing in the chamber 42 (the pressure communicated by the accumulator); for if it has done so, the valve 36 cannot be closed. To summarize, therefore, during an antiskid braking phase relief periods alternate with replenishing periods during which the accumulator is discharged to the brake actuators, as just explained.

By means of the invention, therefore, the brakes can be replenished automatically by means of a simple device, without using additional solenoid valves or electronic control devices for the same.

I claim:

1. An antiskid brake system comprising at least one brake actuator associated with a wheel brake of a vehicle, a fluid pressure source controlled by an operator and connected to the brake actuator by antiskid valve forming means, said valve forming means being normally open to connect the said pressure source to the brake actuator and being responsive, during a braking phase, to the detection of a risk of skidding of the wheel so as to interrupt the fluid connection between the pressure source and brake actuator until the end of the braking phase, and so as to permit subsequently during the braking phase a fluid connection between the brake actuator and a low pressure source in response to the detection of any risk of skidding, the antiskid brake system being characterized in that it includes a device for replenishing said actuator which comprises a pressure fluid reserve source and a connection to connect the reserve source to the brake actuator, means for controlling the flow of fluid through the connection, said control means comprising a valve forming element situated in the connection and normally urged on to a seat under the influence of the pressure from the reserve source, operating means responsive to a pressure difference between the pressure supplied by the pressure source controlled by an operator and the pressure prevailing downstream of the valve forming element, so as to effect opening of this valve when the pressure difference exceeds a predetermined value.

2. An antiskid brake system as claimed in claim 1, characterized in that the operating means comprise a housing containing a bore in which a first piston is slidable so as to separate the bore into a first chamber connected to the pressure source controlled by an operator and into a second chamber situated in the fluid flow path downstream of the control means, the piston being capable of operating a tappet to lift the valve forming element away from its seat when the pressure difference between the first and second chambers exceeds a predetermined value.

3. An antiskid brake system as claimed in claim 2, characterized in that a constriction is provided in the said connection, downstream of the second chamber.

4. An antiskid brake system as claimed in any of the preceding claims, characterized in that the pressure reserve source comprises an accumulator.

5. An antiskid brake system as claimed in claim 4, in which the pressure source controlled by the operator comprises a fluid reservoir, characterized in that the replenishing device comprises a device for recharging the accumulator, the recharging device having a housing defining a variable-volume chamber controlled by a second piston of which the movements depend on the deflection of a suspension of said vehicle, a first non-return valve situated between the variable-volume chamber and the accumulator and designated to prevent the accumulator from discharging to the said chamber, the latter being also connected to the fluid reservoir by way of a second non-return valve permitting the variable-volume chamber to be filled with hydraulic fluid following a depression caused by an increase in volume of the chamber.

6. An antiskid brake system as claimed in claim 5, characterized in that the recharging device comprises an excess pressure valve designed to limit to a predetermined value the pressure prevailing in the variable-volume chamber.

7. An antiskid brake system as claimed in claim 5 characterized in that the replenishing device comprises a single housing incorporating the recharging device.

8. An antiskid brake system as claimed in claim 7, characterized in that the closure element of the valve forming means and the closure element of the first non-return valve are situated in a common bore in the single housing forming an intermediate chamber communicating with the accumulator, the respective closure elements normally resting on their seats, a spring being provided in the intermediate chamber and urging the closure elements away from each other towards their respective valve seats.

9. A replenishing device for an antiskid brake system comprising, a housing defining a first and a second compartment, the first compartment being connectible to a pressure accumulator, and communicating with the second compartment, by way of a first passage, a valve forming element being provided in the first compartment and cooperating with a seat defined at the end of the first passage to control the fluid connection between the first and second compartments in such a way as normally to prevent such a connection, piston forming means being slidably mounted in the second compartment to separate the second compartment into a first and a second chamber connectible respectively to a braking pressure source and to at least one brake actuator controlled by the antiskid brake system, the valve forming element being capable of being urged off its seat in response to movement of the piston resulting from a predetermined pressure difference between the first and second chambers.

10. A replenishing device as claimed in claim 9, characterized in that the piston includes a rod projecting into the second chamber in the second compartment and penetrating into the passage to lift off said valve forming element from its seat, whereby fluid pressure supplied by the accumulator is counteracted in response to movement of said piston.

11. A replenishing device as claimed in claim 9 or 10, characterized in that it comprises a third compartment defined in the housing, the third compartment communicating with the first compartment by a passage and a non-return valve and having a variable volume controlled by the movement of a second piston as a function of the deflection of the suspension of the vehicle, in order to draw liquid into the third compartment from a low pressure source or expel liquid from the third compartment to the first compartment, depending on the direction of movement of the second piston.

* * * * *